T. BILYEU & W. S. OVERLIN.
RECORD MECHANISM FOR COIN DELIVERY MACHINES.
APPLICATION FILED MAR. 27, 1911. RENEWED MAY 26, 1915.

1,165,491.

Patented Dec. 28, 1915.
5 SHEETS—SHEET 1.

Witnesses

Inventors
Thomas Bilyeu
William S. Overlin

UNITED STATES PATENT OFFICE.

THOMAS BILYEU AND WILLIAM S. OVERLIN, OF PORTLAND, OREGON, ASSIGNORS TO INTERNATIONAL MONEY MACHINE COMPANY, OF TERRE HAUTE, INDIANA, A CORPORATION OF INDIANA.

RECORD MECHANISM FOR COIN-DELIVERY MACHINES.

1,165,491.   Specification of Letters Patent.   Patented Dec. 28, 1915.

Application filed March 27, 1911, Serial No. 617,201. Renewed May 26, 1915. Serial No. 30,673.

*To all whom it may concern:*

Be it known that we, THOMAS BILYEU and WILLIAM S. OVERLIN, citizens of the United States, residing at Portland, in the county of Multnomah and State of Oregon, have invented certain new and useful Improvements in Recording Mechanism for Coin-Delivery Machines, of which the following is a specification.

The improvements constituting this invention appertain to the type of money handling machines shown and described in Letters Patent No. 985,136, issued February 28, 1911, and in the application for patent of Thomas Bilyeu, William S. Overlin and Fay A. Gridley, filed April 14, 1910, Serial Number 555,552. In machines of the class referred to, it is especially desirable that the various transactions of the machine, in delivering or paying out money mechanically, shall be listed or printed.

According to this invention, advantageous mechanism is provided for the above purpose, the same being associated with the means controlling the money delivery action of the machine for operation thereby.

It is contemplated by this invention to utilize keys or manipulative devices which are operated to select the coins or money to be paid out, for coöperation with certain printing devices to obtain proper adjustment of the latter to print any amount represented by said keys, other devices being employed intermediate the keys and printing members, to be set in a predetermined position by the keys. The said intermediate devices comprise stops that are directly actuated by the keys and adapted to differentially limit or control the extent of movement of the printing members to enable the latter to print properly on subsequent actuation of suitable means.

A coin or money handling machine with which this invention is preferably designed for use embodies, broadly speaking, manipulative selector mechanism which is initially operated in order to actuate or set in proper position ejector devices or means for forcibly ejecting the money, there being provided an actuator, manually or otherwise operated, by which the said selected ejector devices have imparted thereto their ejecting movement.

The printing mechanism hereinafter more fully disclosed is so designed that the preliminary operation of the selector means aforesaid sets the stops or intermediate members to control the movement of the printing members, while the later operation of the main actuator causes the actual printing action of the said devices to take place.

Specifically, the printing devices or members forming an essential part of the invention consist of type bars mounted to slide in suitable guides and normally held in an inoperative position, the controlling mechanism being adapted to cause movement of the bars at a certain time so that one or more of them will assume their printing position, as determined by operation of manipulative parts that form a portion of the money selecting mechanism of the machine, and the printing impression of the type bars being effected by means operating rectilinearly in respect thereto.

A special feature of the present invention is the provision of peculiar means for controlling the movement of a strip of paper, or the like, on which the transactions of the machine are listed or printed. This printing strip is fed out of the machine by intermittently operating means controlled from the main actuator of the machine. The strip is also acted on by special means whereby the portion thereof to be printed is advanced to the printing members, and after being printed is moved to disclose the printed indicia thereon at a suitable sight opening.

For a full understanding of the present invention, reference is to be had to the following description and to the accompanying drawings, in which—

Throughout the following detail description and on the several figures of the drawings, similar parts are referred to by like reference characters.

Figure 1:
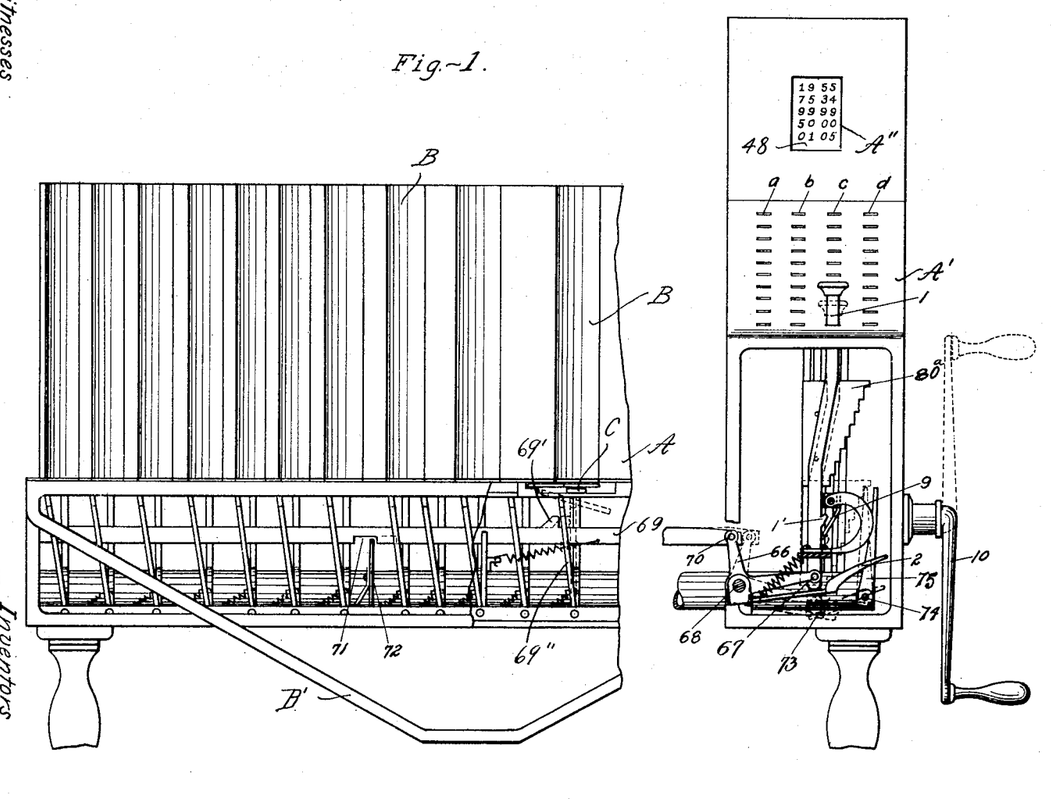
Figure 1 is a front view of a money handling machine embodying the invention, the central portion of the veiw being broken away and the front plate of the key section detached in order to show more clearly certain parts housed by the key section.
Figures 3, 4, 7:
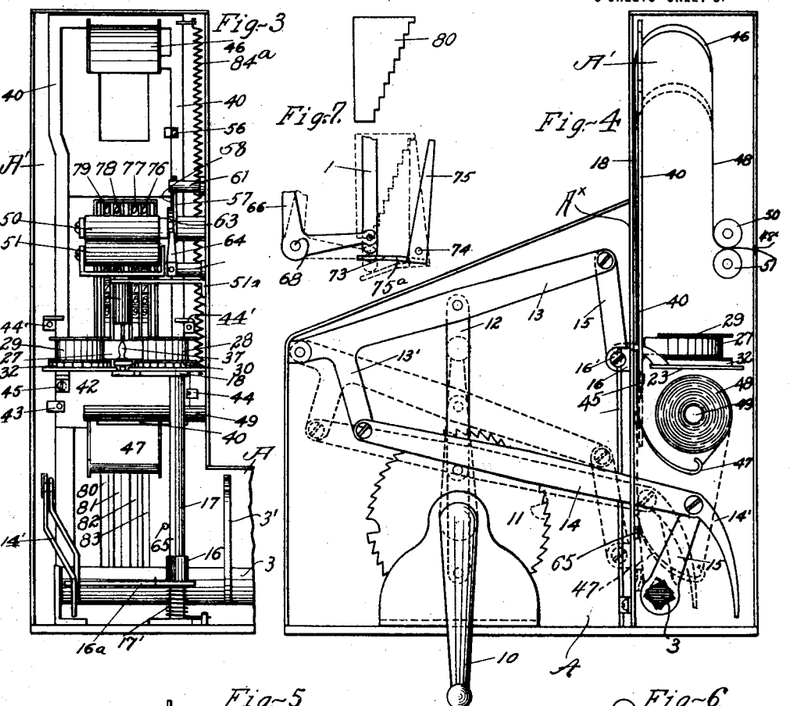
Fig. 3 is a rear view of the key section of the machine with rear plate or door removed to bring out clearly the arrangement of the parts of the printing mechanism, the money or paying section of the machine being broken away.
Fig. 4 is a view somewhat similar to Fig. 2, with a large number of the parts omitted in order to bring out more clearly the connections between the actuator, ejector shaft, and paper carriage.
Fig. 7 is a combined view showing the coöperation of one of the type bar stops with the stepped plate which is attached to the key bar, dotted lines showing the stop in direct coöperation with the stepped plate.

*The money handling mechanism.*—The special mechanism illustrated in the drawings need be described only briefly in that it forms no part of the present invention in its details though it embodies parts which, in the broad phase of their operation, coact with the printing mechanism proper in a peculiar and distinctive manner more fully pointed out hereinafter. At the left hand portion of the machine is located what may be termed the money paying or delivering section A, the same comprising a suitable number of coin receptacles or holders B in which are adapted to be contained coins of different denominations. An ejector C coöperates to control the delivery or ejection of money from each receptacle B and is adapted to move in the path intersecting the base of the receptacle to directly engage a coin and move the latter outwardly until it drops into a suitable delivery chute B' and into the hand of the operator. The ejection of the coins from the machine in predetermined amounts is controlled by a bank of keys 1 which are mounted for vertical movement in the key section A' of the machine. The bank of keys 1 preferably comprise any suitable number of rows of keys, such as marked a, b, c, and d, in the drawings, each row containing ten keys, the foremost one of which has a zero designation on its finger piece while the nine other keys are numbered from 1 to 9 consecutively, toward the rear end of the key section A'. As shown in Figs. 1 and 7, each key 1 is pivotally connected at its lower extremity with one arm of the bell crank lever 66, the other or vertical arm of said bell crank lever being connected at 70 with a selector bar 69 which is adapted to slide longitudinally in the paying or delivering section A of the machine and is notched at 71 in its lower edge so as to receive in the notch a stop 72 by which the movement of the bar 69 is limited. The bar 69 is provided with a projection 69' adapted to engage and operate a yoke or pivoted bail 69'' arranged transversely in the section A of the machine, and which yoke is interlocked with an ejector C to shift the latter into and out of a position in which it will be operative in respect to an ejector arm 3', one of which is shown in Fig. 3. It will be understood that there will be provided a series of ten selector bars 69 for each series of keys represented by one of the rows of the bank of keys 1, and furthermore, each series of selector bars 69 will coöperate with predetermined ejectors to selectively set the latter in a predetermined position preliminary to operation of the machine to accomplish the final ejection of coins representing a predetermined amount. The ejector arms 3' are mounted upon the ejector shaft 3 and there will be one arm 3' for each ejector, all of which construction is fully set forth in the Letters Patent and application hereinbefore referred to. An actuator in the form of a handle 10 and controlling toothed disk 11 is mounted at the right hand of the machine on the key section A' and is operatively connected with a rocker arm 15 on the ejector shaft 3, by means of an operating bar 14, one end of which is pivotally attached to the arm 15 and the other end of which is attached to an arm 13' of a lever 13. A link 12 directly connects the lever 13 with the disk 11 of the actuator and on turning the latter, it will be apparent that a rocking movement will be imparted to the shaft 3 and the ejector arms 3'.

The operation of the money handling mechanism therefore is as follows: A key or keys 1 will be depressed to thereby select an amount equivalent to the amount represented on said keys, and upon depression, each key is locked depressed by engagement of a lug 1' thereof with a locking finger 9, a series of which coöperates with each row of keys. The depression of the key or keys moves corresponding selector bars 69 and sets one or more of the ejectors C in a position in which it is adapted to be operated by the adjacent actuating arms 3'. The handle or actuator 10 is then rotated, its disk 11 having been previously released by depression of the key, from locking means, not shown, and the rocking movement thus imparted to the shaft 3 will cause selected ejectors to be operated by their arms 3' and the requisite amount of money will be discharged into the chute B' from the receptacles B.

Figure 5:
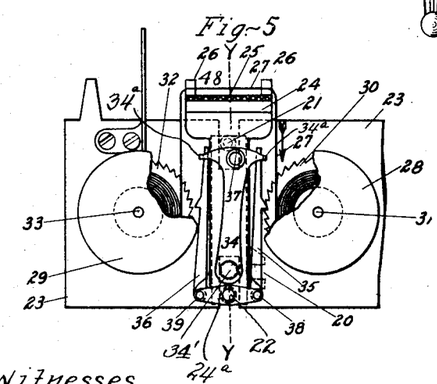
Fig. 5 is a plan view, parts broken away, showing more clearly the ribbon feeding and reversing means associated with the sliding platen that coöperates with the type bars.
Figure 6:
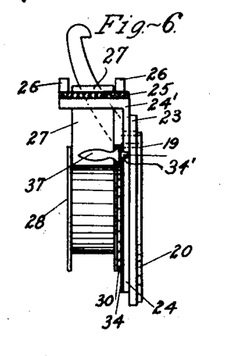
Fig. 6 is a side view of the parts shown in Fig. 5.
Figure 8:
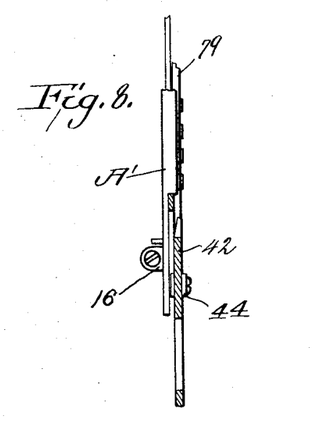
Fig. 8 is a fragmentary view partly in section showing the mounting of the type bars in relation to the lifting plate of the carriage.
Figure 9:
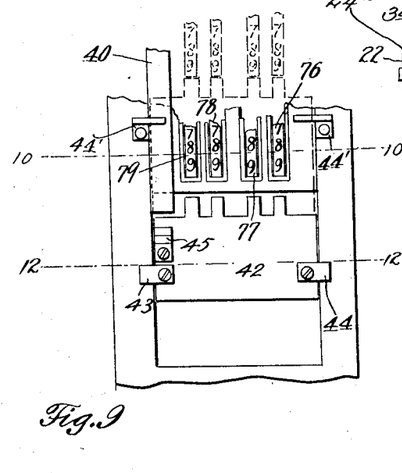
Fig. 9 is a fragmentary front view showing the parts illustrated in Fig. 8 and the supporting means therefor.
Figure 10:
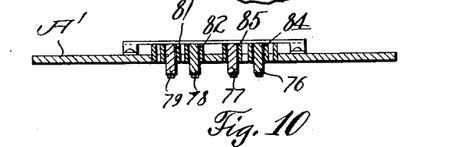
Fig. 10 is a sectional view taken about on the line 10—10 of Fig. 9.
Figure 11:
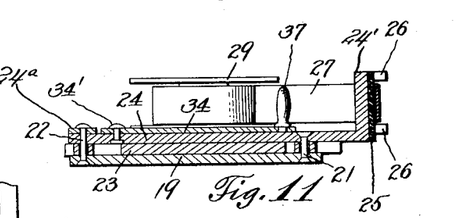
Fig. 11 is a sectional view taken about on the line Y—Y of Fig. 5.
Figure 12:
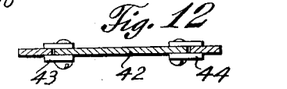
Fig. 12 is a section taken about on the line 12—12 of Fig. 9.
Figure 13:
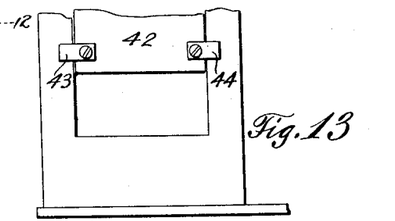
Fig. 13 is a fragmentary view showing the lower portion of the middle plate of the key section and on which the type bars are slidably mounted.
Figure 14:
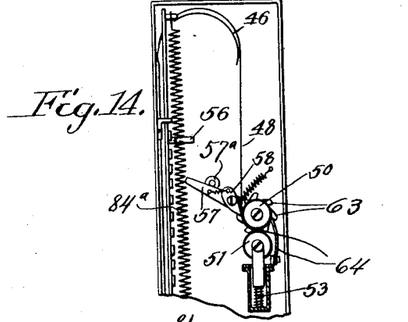
Fig. 14 is a fragmentary view showing more fully the means for feeding out of the machine the printed strip on which the transactions are listed.
Figure 16:
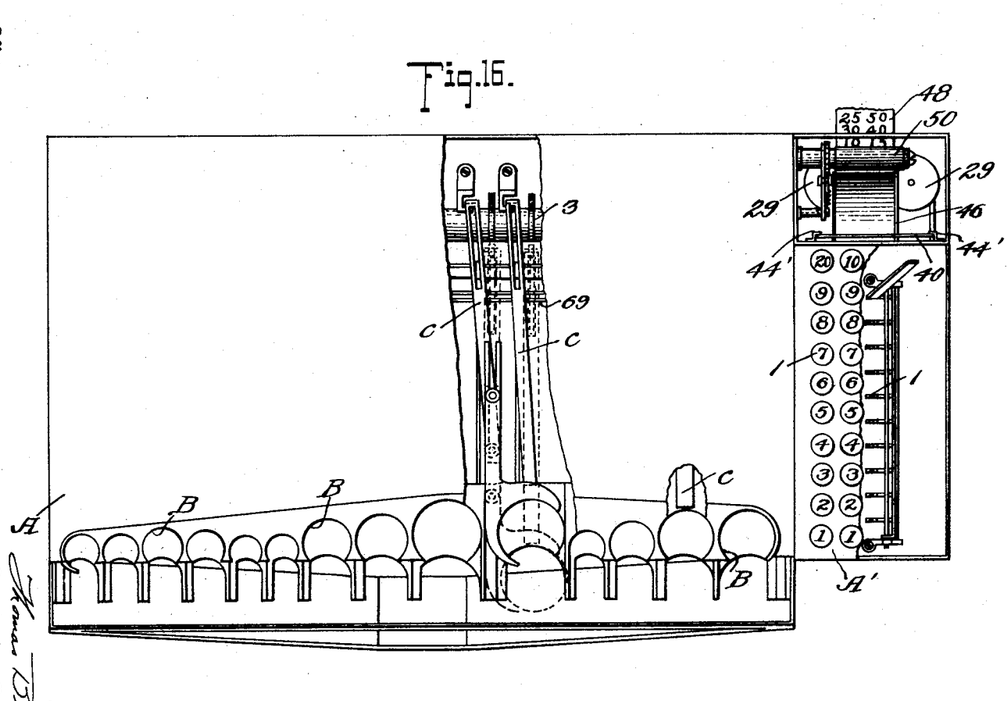
Fig. 16 is a top plan view of the machine, parts broken away, and showing clearly the connections between the actuator and ejectors.

*Printing mechanism.*—The key section $A^1$ of the machine is divided into a front compartment in which the keys and other parts coöperating with their lower ends are arranged and a rear compartment in which the major portion of the printing mechanism is located, said compartments being separated by a wall designated $A^x$ in the drawings. At its upper portion, the wall $A^x$ is exposed in rear of the key board and has a vision opening $A''$ through which the indicia printed or listed on the recording strip 48 may be seen, as will be apparent upon reference to Fig. 1 of the drawings. In suitable guide-ways 80, 81, 82 and 83, provided on the rear side of the wall $A^x$, are slidably mounted the type bars 76, 77, 78 and 79. Each type bar aforesaid is provided upon its rear side with type comprising the numerals 1 to 9, running consecutively downward, and with a zero mark located just above the numeral 1. Normally the type bars 76, 77, 78 and 79 are supported at the uppermost limit of their movement by means of a plate 42, which plate constitutes virtually the lower section of a paper carriage 40. The carriage 40 consists of a frame of somewhat rectangular form, freely slidable in guides 44' secured to the rear side of the wall $A^x$ of the casing. The type bars are arranged between the sides of the frame of the carriage 40 and plate 42 has a bracket or arm 45 secured thereto and is adapted to engage the lower end of the carriage frame and to hold the latter in its normal elevated position shown in full lines in Figs. 3 and 4. Projecting forwardly from the plate 42 through a slot in the wall $A^x$, is an arm 16 pivotally connected at 16' with a link 15 which in turn is pivotally connected with the lever 13. Secured in any substantial manner to the wall $A^x$ and projecting rearwardly therefrom intermediate the upper and lower ends of the key section of the machine is a supporting or base plate 23 having its middle portion slotted from opposite edges so that pins 21 and 22 may extend through said slots. The pins 21 and 22 connect plates 19 and 24 arranged below and above, respectively, the plate 23. The upper plate 24 is a pressure plate and has a platen 24' at one end. The lower plate 19 is formed with a lateral slot 20 shown in Figs. 5 and 6, said slot being adapted to receive one end of an operating arm 18 carried by a vertical shaft 17 mounted in the printing compartment of the key section of the machine. A spring 17' encircles the lower end of the shaft 17 and coöperates therewith to hold the shaft in its normal position. An arm $16^a$ projects from the lower end of the shaft laterally into the path of movement of a cam extension 14' of the operating bar 14. Carried by the supporting plate 23 above referred to are two spools 28 and 29, the axes of which are denoted 31 and 33, respectively. The spools 28 and 29 are adapted to feed an inking ribbon 27 over the surface of the platen 24', said surface having a facing of resilient material 25. The lower flanges 30 and 32 of the spools 28 and 29 respectively, are toothed in opposite directions. A feeding pawl 35 coöperates with the teeth of the flange 30 and a similar pawl 36 coöperates with the teeth of the flange 32, both pawls being pivoted at their outer ends at 38 and 39 to a cross piece $24^a$ which in turn is pivoted between its ends to the pin 22. A reversing lever 34 has a handle 37 and is pivoted at 34' to the plate 24 near the outer end of the latter. Said lever 34 is formed with a transverse head adjacent to the handle 37, from which head downwardly extend lugs $34^a$ that are arranged to engage with the free extremities of the pawls 35 and 36. By movement of the handle 34 in one direction, its lugs $34^a$ will coöperate with the pawls 35 and 36 in such a manner that one pawl will be disengaged from the teeth of one of the ribbon spools and the other pawl engaged with the teeth of the other spool. One of the pawls is then adjusted to rotate the spool engaged thereby in one direction on reciprocation of the plate 24, as hereinafter described. By moving the lever 34 in a direction opposite that above mentioned, the pawl previously disengaged from its spool will be engaged with the teeth of the latter and the other pawl correspondingly adjusted in an opposite manner. By this means, a reversal of movement of the ribbon 27 may be readily effected. The movement of the platen 24' toward and from the type of the type bars 76, 77, 78 and 79 is effected by the partial rotation of the shaft 17 imparted by engagement of the cam 14' with the arm $16^a$. The movement of the shaft as above described, is imparted to the plates 19 and 24 by the arm 18 which engages in the lateral slot 20 of the plate 19.

The recording strip, which is preferably paper, feeds from a roll 48 mounted on a spindle 49, passes first around a paper guide 47 on the lower end of the carriage 40; thence upward between the ribbon 27 and the type bars 76, 77, 78 and 79; thence over a second paper guide 46 carried by the upper end of the carriage 40; from the guide 46 downwardly between two rolls 50 and 51 and from said rolls out of the casing through a slot 48ª in the rear side of the latter. A strip feeding lever 57 is pivoted coaxially with the upper feed roll 50 and said lever carries a dog 58 normally engaging teeth 63 of the feed roll 50. A spring normally holds the lever 57 at the upper limit of its movement in engagement with a stop 57ª and the carriage 40 has a short lateral arm 56 in the path of which the free end of the lever 57 is located. As the carriage 40 moves downwardly, the arm 56 is adapted to strike the lever 57, impart pivotal movement thereto, and thus rotate the roll 50 sufficiently to feed a section of the recording strip from the machine over the paper guides. A spring 84ª is attached at its lower end to the plate 23 and connected at its upper end to the carriage 40 and therefore tends to impart downward sliding movement to said carriage. A spring pawl 64 coacts with the teeth 63 of the roll 50 to prevent reverse rotation of the latter.

It may be noted that by reason of the fact that the recording strip 48 slips longitudinally of the carriage 40 simultaneously with the movement of the strip bodily with said carriage, the extent of movement of the strip 48 is practically two times as great as the length of a single reciprocating movement of the carriage. Such peculiar movement of the strip 48 is required in order that a predetermined printing point on said strip may be raised and exposed at the vision opening of the casing.

The general arrangement of parts comprising the printing mechanism and means for feeding the recording or listing strip has now been described and it will be apparent that in order to print amounts of transactions of the machine, it is necessary to provide means whereby when the keys or manipulative devices 1 are operated, the type bars 76, 77, 78 and 79 will be positioned so that the type thereof corresponding to the number indicia on the keys will be positioned opposite the platen 24′. This done, when the platen presses the inking ribbon and paper strip 48 against the properly positioned type, the impression of the latter will be made upon the recording strip.

Figures 2, 15:
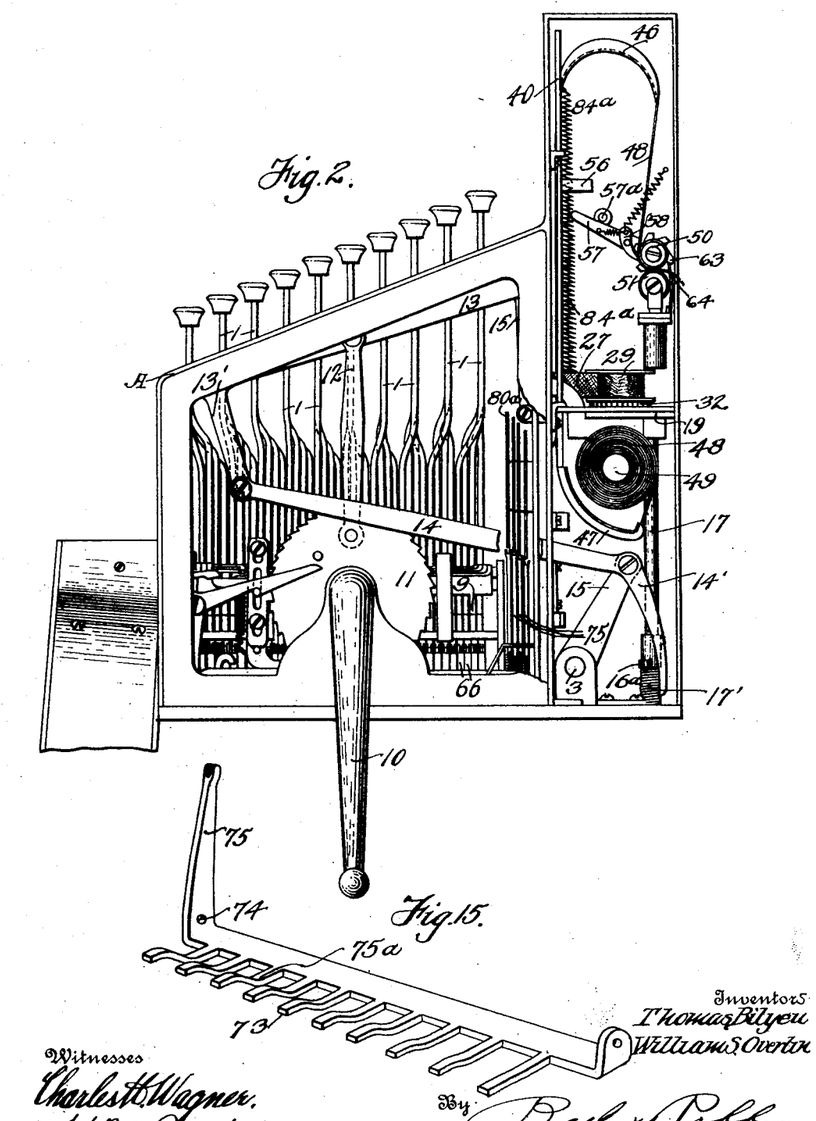
Fig. 2 is an end view of the machine, showing more clearly the general arrangement of the keys or manipulative devices, the actuator, the printing means proper, and the stepped plates which control the adjustment of the type bars.
Fig. 15 is a detail perspective view of one of the stop plates.

In order to obtain the coöperation of parts just described, each series or row $a$, $b$, $c$ and $d$ of the bank of keys is designed to coact with one type bar corresponding thereto. There are ten keys in each row and ten type on each type bar so that means are provided intermediate each row of keys and its associated type bar, whereby the keys of said row may be operated to obtain ten different positions of a type bar, in each of which positions of the bar, a printing operation may be performed. In other words, the various type bars coöperate with the several series or rows of keys and are adapted to be differentially adjusted or controlled by operation of the same to assume their printing positions. With the above in view, each type bar has secured to its front edge, or the edge opposite that carrying the type faces a plate of stepped form having ten steps or stops. The stop plates for the type bars are designated 80ª and are located on the front side of the wall $A^x$ of the casing and in a plane parallel with said wall. There being four type bars, four stop plates 80ª are utilized, and the connection of a stop plate with its type bar is facilitated by the formation on the front edges of said type bars of lugs which pass through slots in the wall $A^x$, the latter forming the guides 80, 81, 82 and 83 for the type bars. A stop member 75 coöperates with each stop plate 80ª and is virtually a vertical arm projecting upwardly from a horizontal plate 75ª, the latter extending transversely of the machine in the front compartment of the key section and being pivotally mounted on a rod 74. The plate 75ª has a rocker arm 73 for each key 1 of a row of keys. The arm 73 has its outer or free end in the path of movement of the lower extremity of a key 1 so that on depression of the latter, said arm 73 will be moved downward and the top member 75 tilted laterally into the path of one of the stops or step of a stop plate 80ª. In other words, in the construction of the machine described and illustrated, there are four rows of keys, four type bars corresponding with said rows, four stop plates 80ª for the type bars and four stop members 75, one to coöperate with each stop plate. There being ten keys in each row of the bank of keys, each plate 75ª will have ten rocker arms 73, each of which is in the path of movement of a key of the row or series of keys which is associated with said plate 75ª. As shown in Fig. 15 the arms 73 are arranged in slightly different horizontal planes so that the keys of a row are adapted to impart differential pivotal movement to the plate 75ª and to its stop member 75 in order to position the latter in any one of ten different adjustments, each of which causes coöperation of the member 75 with one of the stops or steps of the associated plate 80ª. It is necessary that differential movement may be imparted to the plates 75ª because the keys of each row are adapted to move the same distance on depression.

*General operation of machine.*—In order to effect discharge of a certain amount of money, the manipulative devices or keys 1 will be depressed by the fingers 9: Supposing the amount of money to be obtained from the machine as $1.20, the key "1" of row *b*, the key "2" of row *c*, and "0" of the row *d* will be depressed. Depression of said keys operates corresponding selector bars 69 and sets the ejector slides C of proper denominational receptacles B in delivery position in respect to the ejector arms 3'. Simultaneously with the adjustment of the selector mechanism, the depression of the keys named will result in engagement of said keys with the proper arms 73 of three different plates 75ª and correspondingly adjust the stop members 75 of said plates. The stop member 75 operated by the key "1" of row *b* will impart to the coacting member 75 two-tenths of its maximum movement so that said member will be in the path of the second step or stop from the top of its plate 80ª; depression of the key "2" of row *c* will impart to the coacting member 75 three-tenths of its maximum movement so that it will be positioned in line with the third step or stop from the top of its plate 80ª; and depression of the key "0" of row *d* will impart to the coacting member 75, one-tenth of its maximum movement positioning it in line with the uppermost step or stop of its plate 80ª.

The ejector mechanism of the machine is now adjusted ready to discharge money to an amount equivalent to $1.20, and the printing mechanism is adjusted so as to position the type bars for printing said amount. The operator now turns the actuating handle 10 and disk 11, causing immediate downward movement of the lever 13 and forward movement of the bar 14. The movement of the bar 14 rocks the shaft 3 and its ejector arms 3', thereby causing discharge movement of the ejector C. Simultaneously with the movement of the shaft 3, the link 15 forces the plate 42 downward releasing the carriage, so that the latter is pulled down by its spring 84ª, and also releasing the type bars so that the latter are permitted to gravitate downwardly. As the type bars move downward carrying with them their stop plates 80ª, the latter engage with the stop members 75 previously positioned in the manner described and three of the type bars are differentially adjusted and supported in their printing positions by the stop members. On the forward movement of the bar 40, the cam 14' by its engagement with the arm 16ª begins to slightly turn the shaft 17 and the movement of the latter is imparted to the sliding plates 19 and 24 and the platen 24'. At a certain period of the downward movement of the plate 42, the lower end of the carriage 40 strikes a stop 65 which temporarily sustains the carriage in a stationary position while the plate 42 continues its downward movement. Just after the carriage 40 becomes stationary, thus holding the recording strip 48 stationary, the platen 24' is pressed against the now stationary and properly adjusted type bars and causes the proper printed impression to be made upon the recording strip.

The positioning of the carriage 40, as above described occurs during the first ninety degrees of the revolution of the handle 10 and the shaft 17 and platen 24' have been properly operated on completion of the following one hundred and eighty degrees of revolution of said handle, the plate 42 being raised to elevate the type bars and the carriage 40 to their normal positions during the final ninety degrees of movement of the handle 10. By said final movement of the handle 10, the recording strip 48, which has been previously lowered with the carriage 40 to the printing position, is raised and on the next operation of the machine, the amount printed on the strip will appear at the vision opening A" because of the feeding forward of a section of the strip by the lever 57.

The several bell crank levers 66 are mounted upon a common axis 68 and in like manner the several plates 75ª are pivotally supported by the same axis 74. It is to be understood that the number of rows of keys of the key board may be increased at will, according to the desired capacity of the machine, under which conditions, the number of type bars will be correspondingly increased, as well as necessary coacting parts. It is furthermore to be understood that any manipulative devices equivalent to the keys 1 may be employed within the contemplation of the invention and that the broad coöperation of said manipulative devices for initially controlling the adjustment of the selector mechanism, and for at the same time controlling the preliminary adjustment of the stop means coacting with the type bars, all for subsequent operation by the actuator, are intended to be covered by the scope of the present invention.

From the foregoing it will be apparent that the actuator is not only capable of positively operating the ejectors of the ejecting mechanism but it causes a printing action or operation on the part of the printing type bars and its final movement normalizes the various mechanism ready for operation in a new transaction of the machine.

Having thus described the invention, what is claimed as new is:

1. In a printing mechanism for coin delivery machines, the combination of a movably mounted carriage, type bars supported in their normal positions by said carriage, means for actuating the carriage to permit simultaneous movement of the type bars, mechanism for feeding a strip of paper to said type bars, and means for limiting the movement of the type bars to position the same at different adjustments with respect to the paper feeding mechanism.

2. In a printing mechanism for coin delivery machines, the combination with a movable carriage, of printing mechanism including a plurality of type bars supported by said carriage, and a platen to coact with the type bars, paper guiding means for carrying a strip of paper past the type bars, means for actuating the carriage and to permit differential movement of the type bars into printing positions, and means for holding the type bars at different adjustments preliminary to coöperation with the platen.

3. In a printing mechanism for coin delivery machines, the combination of a movable carriage, a plurality of gravitative type carriers normally supported by said carriage in an inoperative position, means for actuating the carriage to thereby release the type carriers, means coöperating with the type carriers to differentially position the same preliminary to printing action thereof, paper guiding means on said carriage and means for feeding paper over the guiding means and operable by the carriage.

4. In a printing mechanism for coin delivery machines, the combination of a plurality of type carriers, a platen adapted to coöperate therewith, keys arranged in rows of different denominations and each row for coöperation with a type carrier, a pivoted stop device associated with each row of keys and consisting of a stop member having a plurality of arms, each for direct actuation by a key of the associated row, means on each type bar to coact with the stop member of the associated stop device, whereby the type bar is positioned at a predetermined printing point, and means for causing movement of the type carriers to their printing positions.

5. In a printing mechanism for coin delivery machines, the combination with a plurality of type carriers, stepped plates attached to said type carriers, keys, levers operable by said keys, said levers having arms movable into the path of movement of the stepped plates aforesaid, means for normally holding the type carriers in predetermined positions, and means for releasing said type carriers to permit movement thereof whereby one or more of the type carriers are engaged by the arms of the levers previously actuated by the keys.

6. In a printing mechanism for coin delivery machines, the combination of a sliding carriage, means for normally holding said carriage in a predetermined position, a plurality of type carriers normally held in an inoperative position by said carriage and adapted for longitudinal movement, means for operating the carriage to release the carriers, members coacting with the carriers to differentially limit their movement when released, and mechanism for setting the last mentioned members in predetermined positions to thereby control the degree of movement of the type carriers when released.

7. In a printing mechanism for coin delivery machines, the combination of printing mechanism including a plurality of type bars, a platen, and a reciprocating paper feeding carriage, means supported by said carriage for holding the type bars normally in inoperative positions, said mechanism controlling the degree of movement of the type bars when released to properly position the same with regard to the platen, and means for simultaneously reciprocating the carriage to release the type bars and for operating the platen aforesaid.

8. In a printing mechanism for coin delivery machines, the combination of printing mechanism including a plurality of type bars, an inking ribbon platen movable toward and from said type bars, a shaft, an arm carried by said shaft to reciprocate said platen, a reciprocating carriage for normally holding the type bars in inoperative positions and having paper guiding means, and mechanism for reciprocating the carriage to release the type and simultaneously rotate the shaft to operate the platen.

9. In a recording mechanism for coin delivery machines, the combination of a vertically movable carriage, means for reciprocating the same, a plurality of type bars normally supported in an inoperative position by said carriage, a shaft, a platen coacting with the type bars to accomplish the printing operation, an arm on said shaft to engage and actuate the platen, a lever connected with the carriage for reciprocating the same to release and permit gravitation of the type bars, means for controlling the gravitating movement of the respective type bars, and means operable from said lever for rotating the shaft to actuate the platen.

10. In a recording mechanism for coin delivery machines, the combination of a movable carriage, type bars held in a predetermined position thereby, means for actuating the carriage to permit movement of the type bars, associated printing mechanism coacting with the type bars, strip paper feeding means, and means for operating the paper feed mechanism from the carriage.

11. Printing mechanism comprising manipulative devices, printing members, stop means intermediate said manipulative and printing devices adapted to be operated by the former to control the extent of movement of the printing members, a carriage having paper guiding means and normally holding the printing members in a predetermined position, and a lever controlled means to release the printing members after adjustment of the stop means.

12. Printing mechanism for money handling machines comprising manipulative keys, printing members, pivoted stop members intermediate the keys and printing members and each having a plurality of arms adapted for direct actuation by the former to assume a position to differentially limit the movement of the printing members, means for holding the printing members in a normal position, means to release said members after operation of the stop means, a platen arranged to coact with the printing members after movement of the latter to a printing position, and means for causing relative movement of the platen and printing members to complete a printing operation and to later return the printing members to normal positions after a printing operation.

13. In a money handling machine, money holders, ejector means adapted to eject money from the holders, printing members, key controlling mechanism including separate series of keys, a single stop device adapted to be differentially adjusted by each series of keys to regulate the movement of the printing members in assuming printing position, and an actuator for causing movement of the printing members as limited by their respective stop devices and for controlling the operation of the ejector means.

14. In a money handling machine, money holders, ejector means adapted to eject money from the holders, printing members, key controlling mechanism including separate series of keys, a pivotally movable stop differential adjustment of which is controlled by each series of keys to regulate the movement of the printing members in assuming printing position, and an operating handle capable of effecting printing adjustment of the printing members and simultaneously causing discharge action of the ejectors.

15. In a money handling machine, money holders, ejector means adapted to eject money from the holders, printing members, key controlling mechanism including separate series of keys, a single stop member differential adjustment of which is controlled by each series of keys to regulate the movement of the printing members in assuming printing position, selector means coöperating with each series of keys to control the operation of predetermined ejector means, an actuator connected with the ejector means for operation thereof and adapted to cause movement of the printing members to printing position and means also operable by the actuator to cause printing action of the printing members after they reach printing positions.

16. In a money handling machine, money holders, ejector means adapted to eject money from the holders, printing members, key controlling mechanism including separate series of keys and stop means adapted to be differentially adjusted by each series of keys to regulate the movement of the printing members in assuming printing position, selector means coöperating with each series of keys to control the operation of predetermined ejector means, an actuator connected with the ejector means for operation thereof and adapted to synchronously cause movement of the printing members to printing position, and means operable by the actuator to cause printing action of the printing members after they have reached their printing positions.

In testimony whereof we affix our signatures in presence of two witnesses.

THOMAS BILYEU.
WILLIAM S. OVERLIN.

Witnesses:
JOSEPHINE BILYEU,
CHRISTINE PETERSON.

Copies of this patent may be obtained for five cents each, by addressing the "Commissioner of Patents, Washington, D. C."